Jan. 2, 1934.                O. HENNINGS                1,941,895
                              FILTER
                         Filed Nov. 20, 1930
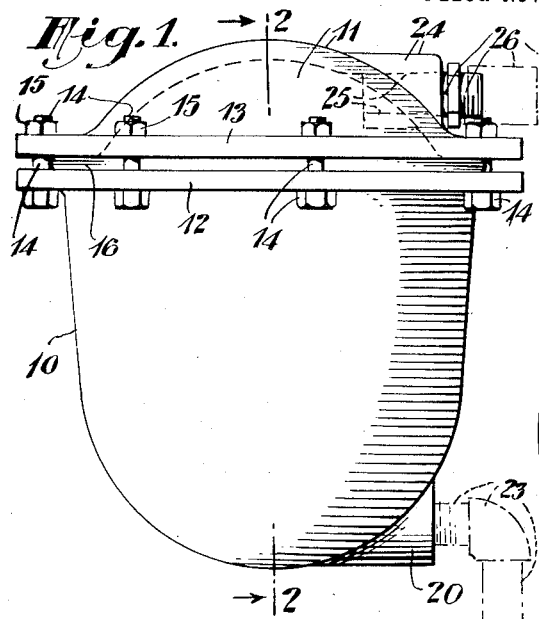
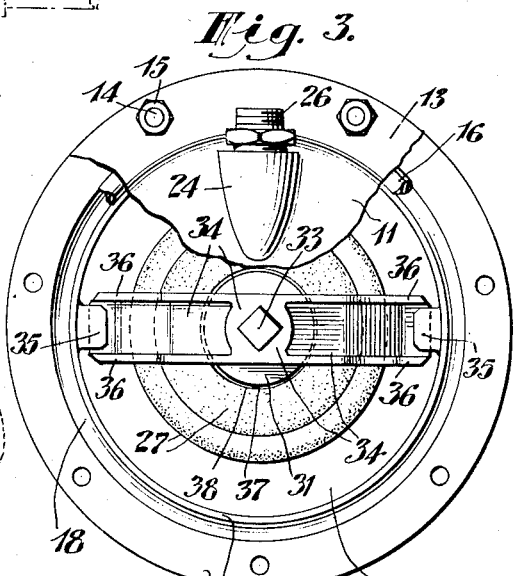
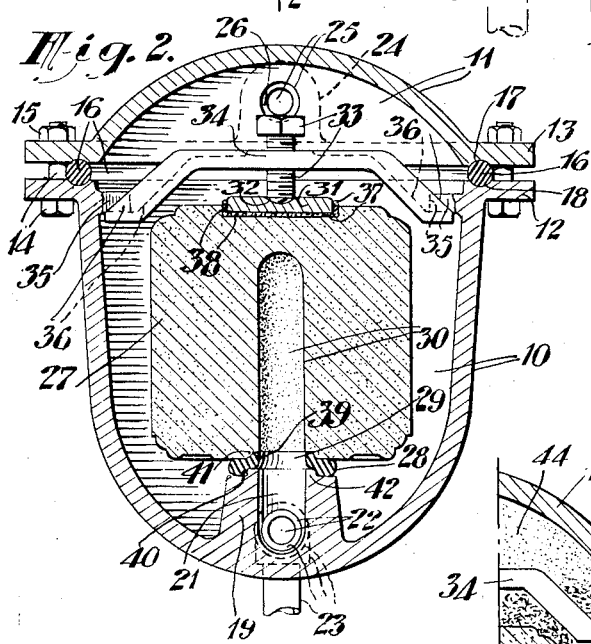
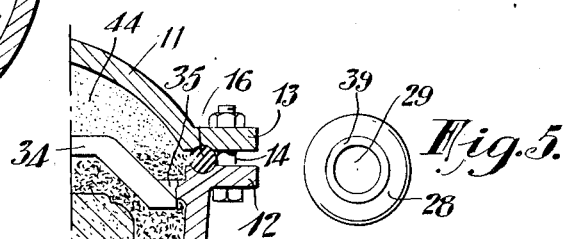
INVENTOR
OSCAR HENNINGS
BY
ATTORNEYS Patented Jan. 2, 1934

1,941,895

UNITED STATES PATENT OFFICE 1,941,895

FILTER

Oscar Hennings, Montclair, N. J.

Application November 20, 1930
Serial No. 496,882

7 Claims. (Cl. 210—112)

This invention relates to improvements in filters and more particularly to water filters of the type in which the filter bed includes a permeable block of carbon or similar filtering material as the final medium through which the water passes to the filter outlet, said block having an internal chamber or bore open only to the filter outlet and into which the water can pass only by penetrating the carbon body of the block.

The invention has for its principal objects to provide improved means for supporting the carbon block in the filter casing with its bore or chamber in open communication with the filter outlet; to provide a simple, efficient and inexpensive mounting for the block permitting ready assembly thereof and quick and easy removal of the block when it becomes necessary to renew the block portion of the filter; to provide a carbon block assembly in the filter whereby liability of accidental derangement of the block or breaking of the supporting means in shipment, handling or installation of the filter is prevented or reduced to a minimum; and to provide a block mount so constructed that liability of destruction of the efficiency of the filter by reason of breaking down of the support from electrolytic action in the filter is reduced to a minimum; and to provide a block assembly affording a securely maintained seal between the block cavity and filter casing.

Other objects and advantages of the invention will appear from the following description of a preferred embodiment of the invention illustrated in the accompanying drawing in which:

Fig. 1 is a side elevation of the improved filter;

Fig. 2 is a vertical sectional view on the line 2—2 of Fig. 1, the block element only of the filter bed being shown, to more clearly disclose the block mounting;

Fig. 3 is a top plan view of the parts as shown in Fig. 2, part of the detachable cover of the filter casing being broken away;

Fig. 4 is a fragmentary view similar to Fig. 2 showing the arrangement of the complete filter bed;

Fig. 5 is a top plan view of the sealing washer; and

Fig. 6 is an edge view, partly in section, of the sealing washer.

The casing of the filter is preferably formed of galvanized cast iron or enameled cast iron, such a casing having the advantages of strength and resistance to corrosion and small susceptibility to destruction by electrolysis. The casing comprises a main body portion 10 and a removable cover portion 11, the body being preferably of relatively deep bowl form and the top or cover being preferably of relatively shallow or flat dome form, as shown. The body 10 and cover 11 are formed with registering horizontal edge flanges 12 and 13 through which extend bolts 14 having nuts 15 threaded thereon, said bolts and nuts clamping an annular rubber packing ring 16 between the flanges which preferably have shallow annular seats 17 and 18 for the packing ring.

Projecting upward from the bottom of the body portion 10 centrally of the casing is a short annular boss 19 and projecting outward from the bottom of said casing portion, preferably laterally as shown, is a short internally threaded boss 20 the bore 22 of which leads into the bore 21 of boss 19 to form with said bore 21 the water outlet passage of the filter through which the purified or filtered water passes to discharge conduit 23 which has a threaded portion screwed into boss 20. A short boss 24 extends outward from cover 11, preferably laterally in the same direction as boss 20 and in vertical alignment therewith as shown, said boss 24 having an internally threaded bore or water inlet passage 25 in which is screwed a threaded portion of the water supply or inlet pipe or conduit 26. The bosses 19, 20 and 24 are cast integrally with the parts of the filter casing by which they are carried.

Bosses 19 and 20 form the filtered water outlet of the filter and boss 19 also forms a raised seat or fixed supporting element for the lower end of the carbon block 27 of the filter bed, the upper end of the boss constituting the relatively stationary one of two superposed relatively vertically shiftable clamping heads between which the carbon block 27 is clamped to removably hold the same in place in the filter casing with its water discharge chamber or bore open only to the upper end of the water outlet passage 21.

To prevent water from passing around the filter bed block 27 into outlet 21 an elastic sealing washer 28 is interposed and compressed between the upper end of boss 19 and the lower end of the carbon block 27 with its central aperture 29 registering with the vertical or axial bore or cavity 30 of the carbon block which block is preferably in the form of an upright cylinder of carbon or other suitable permeable filtering material. As shown, and preferably, the axial bore 30 is sealed at its upper end by an integral portion of the carbon block against entrance of water that has not permeated through the carbon block, although it will be obvious that a block having a bore entirely therethrough, with its upper end sealed by the upper portion of the clamping means or other suitable means, may be employed if desired.

The upper clamping head for the block 27 preferably comprises a rigid clamping disk 31 adapted to seat on the upper end of the block at the center of the block directly above boss 19. Centrally of its upper face clamping disk 31 is preferably provided with a shallow depression 32 concave in cross-section to receive the lower rounded bearing end of a vertically disposed clamping bolt 33 threaded down through a cross-bar or bridge member 34 midway the ends of said cross-bar. Cross-bar 34 has its opposite ends engaged under two diametrically opposite lugs or projections 35 which extend horizontally inward from the sides of body portion 10 of the filter casing preferably at, or substantially at, the top of said body portion as shown, the end portions of the bar being channelled on their top faces to afford a pair of upstanding edge flanges 36 at each end of the bar between which the lugs 35 are engaged to prevent accidental disengagement of the cross bar from the body 10 of the casing.

The elastic sealing washer 28 in the preferred construction shown is formed of pure rubber to afford an elastic water-tight seal packing that will remain tight whether dry or wet and which will at the same time electrically insulate the carbon block 27 from the metal supporting boss or seat 19. The pure rubber washer has the advantage also of being free from sulphur and other substances which are liable to affect the taste and purity of the filtered water passing into the filter outlet.

In the preferred construction shown the upper end of the carbon block is electrically insulated from the clamping disk 31 by a suitable non-conducting disk 37, said disk in the construction shown being formed of mica and extending under clamping disk 31 and up about the edge of the disk 31 which preferably extends down into a shallow circular depression 38 formed in the upper end of the carbon block centrally of the block to center the disk 31 for engagement by bolt 33. To center the carbon block and clamping disk 31 for coaction therewith of the clamping bolt 33 on cross-bar 34, washer 28 is preferably provided on its upper face with an annular upstanding flange 39 surrounding its aperture 29 and on its lower face with an annular pendent marginal flange 40. Washer flange 39 seats in an annular recess or enlarged lower end portion 41 of the carbon block bore 30, and washer flange 40 surrounds a reduced upper portion 42 of boss 19.

The cross-bar 34, bolt 33 and disk 31 may be formed of any suitable material, preferably, and in the construction shown, being formed of brass coated with tin to prevent corrosion. The hard carbon block 27 constitutes the final filtering medium of the filter bed, the casing being preferably packed full with suitable filtering material through which the water passes before reaching the carbon block. In the filter shown, the filter bed comprises, in addition to the carbon block, coarse charcoal particles 43 packed around the carbon block in body portion 10 and finely granulated charcoal 44 packed in the dome portion of the casing on top of the coarser charcoal 43.

It will be observed that the cross-bar anchor lugs are at or near the top of body portion 10 of the casing and that the cross-bar 34 is arched upward at its central portion to extend into the dome slightly above the top of portion 10, so that when the dome cover 11 is detached the bolt head and cross-bar are readily accessible for manipulation to detach the cross-bar and lift out the carbon block for replacement of the old block by a new block, the block also extending up substantially to the top of body portion 10 of the casing.

It will be observed that the construction of the block supporting means is such that attack thereof by electrolytic action in the filter is reduced to a minimum, and that the support will effectively and efficiently maintain the block in proper position for a long period without danger of leakage of water around the block to the outlet as a result of shocks or disintegration of the supporting means by electrolysis, the usual relatively frail supporting tube extending into the block bore and imperfectly maintained water seals for the block being avoided. Supporting tubes or hollow posts extending into or through the carbon block bore must necessarily be relatively thin and frail, and are subject to bending or breaking under shocks, which destroys the water seal between the block bore and filter casing, and are also subject to rapid disintegration by electrolytic action in the filter.

What I claim is:

1. A filter comprising a filter bed casing having an open top and a closure for said open top, means connected with the bottom of the casing forming a raised support for the lower end of a filter block, a block of filtering material seated on said support having a cavity open at its lower end only and centrally of the block bottom, said open end of the cavity being located wholly above the support and said support having an outlet passage for filtered material open only to the lower end of said cavity and in communication with the exterior of the casing, said casing having an inlet for material to be filtered opening thereinto exteriorly of the block, a fluid proof washer interposed between the upper end of said support and the lower end of said block with its aperture registering with said passage and cavity opening, a pair of lugs extending inward from opposite sides of the casing, a rigid bar extending over the top of the block with its ends engaged under said lugs, and a vertically disposed member threaded through said bar over said support for holding the bar ends pressed up under said lugs and the block pressed down upon said elastic washer and the support.

2. A filter comprising a filter bed casing having an open top and a closure for said open top, means connected with the bottom of the casing forming a raised support for the lower end of a filter block, a block of filtering material seated on said support having a cavity open at its lower end only and centrally of the block bottom, said open end of the cavity being located wholly above the support and said support having an outlet passage for filtered material open only to the lower end of said cavity and in communication with the exterior of the casing, said casing having an inlet for material to be filtered opening thereinto exteriorly of the block, an elastic fluid proof washer interposed between the upper end of said support and the lower end of said block with its aperture registering with said passage and cavity opening, a pair of lugs extending inward from opposite sides of the casing, a rigid bar extending over the top of the block with its ends engaged under said lugs, a rigid plate seated on the top of the block centrally of the block top, and a vertically extending member threaded through said bar midway the ends of the bar and engaged with said plate.

3. A filter as claimed in claim 2, wherein said washer and the top of the support and bottom of the block are provided with interfitting portions for centering the block in the casing.

4. A filter as claimed in claim 2, wherein said washer and the top of the support and bottom of the block are provided with interfitting portions for centering the block in the casing, and said block has a recess in the top thereof for receiving and centering said plate relatively to said threaded member.

5. A filter comprising a casing, a block of filtering material having a cavity open at its lower end through the block bottom, said casing having an outlet passage for filtered material open at one end only to the lower end of said cavity and its other end in communication with the exterior of the casing, said casing having an inlet opening thereinto exteriorly of the block, a washer of material non-conductive of electricity interposed between the bottom of said casing and the lower end of said block with its aperture registering with said outlet passage and with the cavity opening and forming a sealed fluid passage from the block cavity to the said outlet passage of the casing, a rigid bar extending over the top of the block with its ends engaged with stops in the casing, a clamping member carried by said bar and adapted to force the bar ends up under said stops and the block down upon said non-conducting washer to detachably hold the said bar and said block in position; and material non-conductive of electricity interposed between the filter block and said clamping means, whereby the filter block will be entirely supported by non-conducting material and out of contact with metal.

6. A filter comprising a casing, a block of filtering material having a cavity open at its lower end through the block bottom, said casing having an outlet passage for filtered material open at one end only to the lower end of said cavity and its other end in communication with the exterior of the casing, said casing having an inlet opening thereinto exteriorly of the block, a washer of material non-conductive of electricity interposed between the bottom of said casing and the lower end of said block with its aperture registering with said outlet passage and with the cavity opening and forming a fluid passage from the block cavity to the said outlet passage of the casing, means engaging the top of the filter block to force it down in sealing engagement with the non-conducting washer at the bottom of the casing to seal the outlet passage from direct communication with the interior of the casing and detachably hold the filter block in position, and means non-conductive of electricity insulating the upper end of the block from the filter casing.

7. A filter comprising a casing having an inlet and an outlet, a filter block mounted in the casing spaced away from the walls thereof, a draining recess in the filter block in communication with the outlet, means for clamping the filter block in said casing, said means embodying means for electrically insulating said filter block from the casing to thus prevent electrolytic action.

OSCAR HENNINGS.